ND1 3,620,402

United States Patent

| [72] | Inventor | Robert J. Wentland<br>Hinsdale, Ill. |
| [21] | Appl. No. | 853,790 |
| [22] | Filed | Aug. 28, 1969 |
| [45] | Patented | Nov. 16, 1971 |
| [73] | Assignee | The Richardson Company<br>Melrose Park, Ill. |

[54] CONSTRUCTION OF POLYOLEFIN CONTAINERS
5 Claims, 2 Drawing Figs.

[52] U.S. Cl. .................................................. 220/4 R,
136/170, 156/82, 220/21
[51] Int. Cl. .................................................. H01m 1/02,
B65d 11/10
[50] Field of Search .......................................... 220/4, 21;
136/170; 156/82

[56] References Cited
UNITED STATES PATENTS
3,075,868  1/1963  Long .............................. 156/82

| 3,198,692 | 10/1965 | Bridgeford | 161/188 |
| 3,298,870 | 1/1967 | Sabatino | 136/170 |
| 3,388,007 | 6/1968 | Fiandt | 136/170 X |
| 3,416,970 | 12/1968 | Sabatino | 136/170 X |

*Primary Examiner*—George E. Lowrance
*Attorneys*—John L. Hutchinson, William Lohff and Alan M. Abrams ABSTRACT: A container constructed at least partially of polyolefin and the remainder of a rubber composition or other easily bondable material, is made with at least one airtight seal with an excellent bond strength which is formed from mating surfaces of adjoining sections of the container wherein at least one of the sections is polyolefin. As illustrated by a thin-walled, electric storage-battery container constructed of polypropylene having multicompartments wherein each compartment is to be isolated from the others, the seals are formed by oxidizing the adjoining surfaces preferably by an oxidizing flame and by applying a curable adhesive on the oxidized surfaces to form the desired bond.

PATENTED NOV 16 1971　　3,620,402
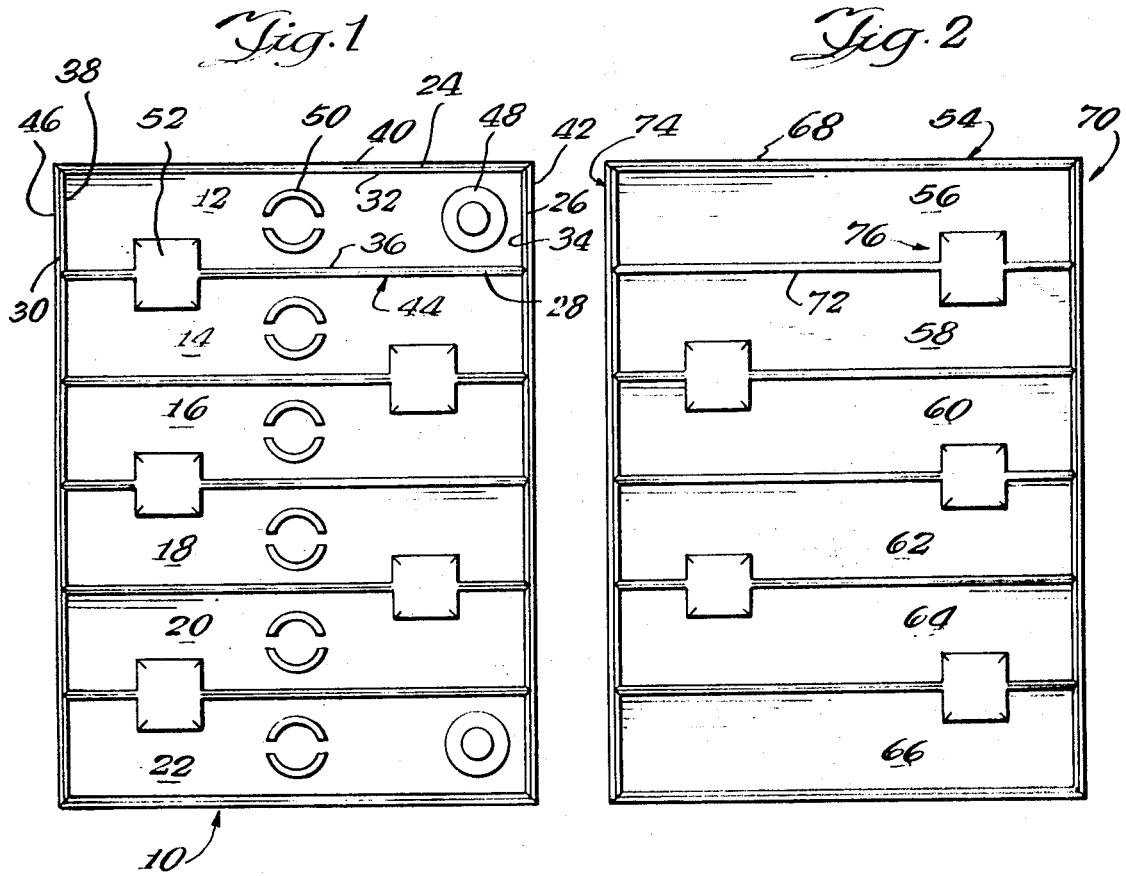
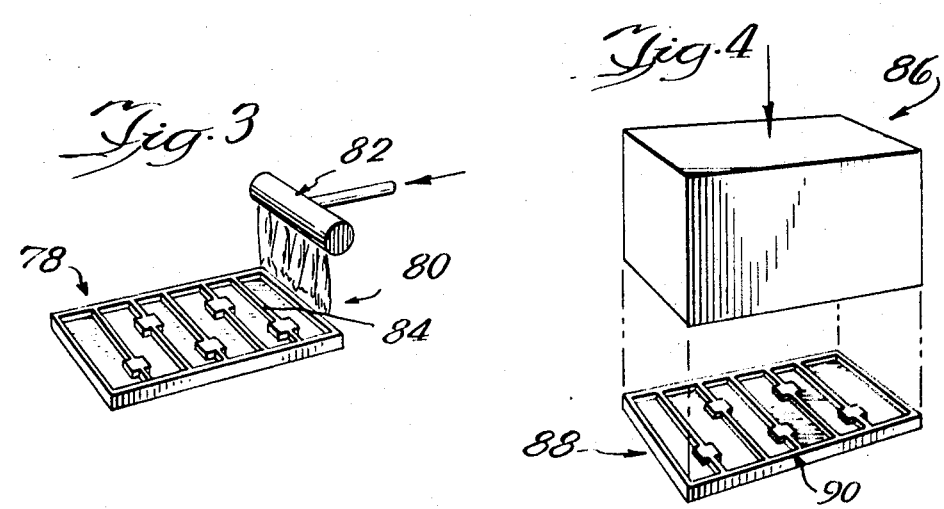
INVENTOR
Robert J. Wentland
BY William Lohff
ATTORNEY

3,620,402

CONSTRUCTION OF POLYOLEFIN CONTAINERS

BACKGROUND

This invention relates to containers with one or more inner compartments and constructed at least partially of polyolefin and more particularly to multi compartment containers with an airtight seal connecting adjoining sections of the container.

Polyolefin thermoplastics such as polyethylene, polypropylene and the like are commonly used as raw materials in many molding operations for producing various items of commerce. At times, these items are used in combination with plastic parts composed of rubber compositions, phenolics, and the like.

Containers with one or more inner compartments and with large hollow interiors and relatively thin wall sections in respect to the interior dimensions are widely used to hold or retain various solids and liquids. In particular, multicompartment containers represent such commercial products as beverage carriers, electric storage-battery boxes, and the like. In some instances, these containers are open at one end and in other instances, they are provided with a cover which can be of a different material from that of the box or case. With electric storage-battery containers, the cover is permanently affixed on the main box so as to form a unitary structure with a seal that withstands attack by sulfuric-acid solutions. In addition, the seal must be capable of holding the container together under the stress caused by lead electrodes and sulfuric-acid solutions. Often, these loads under test conditions are in the order of 100 lbs. or about 2 lbs. per linear inch of wall and partition sections.

Recently, multicompartment containers with unusually thin walls and partitions have been formed from polypropylene in an injection-molding operation. These containers are generally characterized by walls of about 0.10 inch and below which provide greater compartment capacities with comparable external dimensions. These containers have become particularly useful as electric storage-battery containers.

However, procedures for forming these closed containers have not always been completely satisfactory. In some instances, a heating process is utilized wherein one or both sealing surfaces are melted and the combination of cover and box rapidly mated together. In other instances, attempts have been made to utilize adhesives to mate the surfaces together although the bond formed has usually been inadequate. In general, these procedures have not provided a convenient and reliable process for producing closed containers of polyolefin with an airtight seal capable of withstanding large forces created by heavy lead-electrode and sulfuric-acid solutions.

SUMMARY

Briefly, the invention is directed to a polyolefin container with one or more inner compartments, with a large hollow interior and with relatively thin wall sections. The container is formed by joining adjacent mating surfaces of polyolefin or polyolefin and a second material to form an airtight seal characterized by excellent bond strengths. This is achieved by forming a mating surface of oxidized polyolefin on each polyolefin section, applying an adhesive to one or both surfaces, and curing the combination. When closed, multicompartment containers are formed from cover and box sections, the result is a closed container with isolated compartments and capable of holding heavy loads such as lead electrodes and aqueous sulfuric-acid solutions.

DESCRIPTION OF DRAWINGS

In the drawings:

FIG. 1 is an under view of a cover for an electric storage battery container with provisions for cell vents, electrodes, intercell connectors, and the like.

FIG. 2 is a top view of a battery case showing multicompartments defined by partition walls and outer walls.

FIG. 3 is a perspective view of a flame generator and container cover illustrating the use of an oxidizing flame in forming oxidized polyolefin surfaces on the cover.

FIG. 4 is a perspective view of a container case and cover being joined in an inverted assembly wherein the adhesive is held in channels of the cover.

In FIG. 1, container cover 10 is illustrated in a form suitable for an electric storage battery. Cover 10 is designed to cover six cells with cell covers 12, 14, 16, 18, 20 and 22. For simplicity, cell covers 12 and 14 will be described with this description applying to the other sections of the entire cover. Cell cover 12 is defined by channels 24, 26, 28 and 30 which in turn are defined by inner walls 32, 34, 36 and 38 and outer walls 40, 42, 44, and 46. Terminal 48 and a mounting 50 for a vent plug are also illustrated. Channel 28 has one wide section 52 which is designed to accommodate a cell-interconnector.

Typically, channel 28 is of a width in the order of about 0.050–0.090 inches and channels 24, 26 and 30 are in the order of about 0.060–0.120 inches. Both are about 0.300–0.700 inches deep and designed to fit with projections or mating surfaces on the container case.

In FIG. 2, container case 54 is illustrated as a storage-battery case or box having six cells 56, 58, 60, 62, 64 and 66. Cell 56 is typical of the others and is defined by walls 68, 70, 72 and 74. Cell-interconnector 76 is shown on wall 72 to interconnect the electrodes (not shown) of cells 56 and 58. Walls 68–74 are designed as projections to fit with mating surfaces of cover 10 in FIG. 1. These mating surfaces are multiplanar and as illustrated form a tongue in groove arrangement.

In FIG. 3, cover 78 is shown being exposed to flame 80 from flame generator 82. The oxidizing portion 84 of the flame 80 is applied to the mating surfaces of the polyolefin cover 78 for a time sufficient to form an oxidized surface. Usually, this is in the order of about 10 seconds. Advantageously, the flame treatment is applied to multiplanar surfaces and preferably to those forming a tongue-in-groove arrangement to provide surfaces capable of forming a better bond. After flame treatment, the exposed portions of cover 78 commonly have surfaces which indicate that some melting has occurred. Usually, it is advantageous to oxidize the mating surfaces a depth of about 0.30 inches or more to provide sufficient bonding area for the subsequent application of adhesive.

In FIG. 4, case 86 and cover 88 are illustrated in an inverted position convenient for the sealing operation. A curable adhesive such as an epoxy or polyester resin has been applied to the oxidized-polyolefin mating surfaces in cover 88 and typically occupies most of the depth of channel 90 in cover 88. Typically, these channels are about 0.50 inches deep and the adhesive occupies about 0.43 inches to provide adequate adhesive for the adjoining mating surfaces of case 86 and the cell-interconnectors as illustrated in FIGS. 1 and 2.

In the sealing operation, case 86 and cover 88 are joined and subjected to curing conditions commonly at a temperature of at least 15° C. to cure the adhesive and provide an airtight seal. With a container for an electric storage battery, case 86 will contain lead electrodes which will provide pressure on the connection during curing.

After assembly and curing of the adhesive of the closed container as illustrated in FIGS. 1–4, the container is normally tested to determine the adequacy of the seals which isolate the cells and join the cover. These tests typically demonstrate that the cells are airtight as measured by a pressure of 3 p.s.i.g. and a vacuum of 12 inches of mercury even when tested after exposure to 160° F. for 24 hours and 0° F. for 24 hours. The tests also reveal that the seals are resistant to sulfuric-acid solutions and have a bond strength sufficient to withstand forces due to the weight of lead electrodes and sulfuric-acid solutions. Commonly the bond strengths exceed the tensile strength of the polypropylene polymer.

As described above, I have provided a container constructed at least partially of polyolefin and having a bonded connection between opposing mating surfaces of portions of the container, which connection is characterized by being airtight and having excellent bond strengths, the bonded connection being a cured combination of oxidized polyolefin with an epoxy or polyester adhesive coating on the oxidized polyolefin.

Advantageously, the container is constructed of polypropylene and includes a case and cover wherein the compartments are enclosed by external walls and inner partitions with appropriate mating surfaces on both the case and cover. Typically, the partition walls are about 0.050–0.100 inches and the external walls are about 0.060–0.150 inches.

The adhesive is a thermosetting or flexible epoxy or polyester resin and advantageously the epoxy resin. Sufficient amounts are used to cover substantial portions of the oxidized surfaces on the case and cover and thereby form the desired bond.

The container is formed from individual portions or sections by a method of bonding sections of a polyolefin, multicompartment container to form an airtight connection resistant to sulfuric-acid solutions, which method comprises, subjecting mating surfaces of the polyolefin sections of the container to oxidizing conditions to provide oxidized surfaces, applying a curable adhesive on at least one of the oxidized, mating surfaces, and combining the surfaces under curing conditions to form the connection.

The oxidizing medium can be an oxidizing chemical such as an oxidizing acid, flame treatment or similar technique. However, flame treatment is preferred since the oxidation can be carried out in a one-step process and without the washing steps and other disadvantages with a liquid treatment.

When the cover section of the container has channels as illustrated in FIG. 1, the method advantageously includes an assembly by inverting the case unto the cover. In this manner, the channels serve to hold a quantity of adhesive sufficient to form the desired bond.

I claim:

1. A polypropylene battery container comprising a case and cover with one or more inner compartments, said container having a bonded connection between mating surfaces of the case and cover, which connection comprises a polypropylene surface oxidized to a minimum depth of about 0.30 inch and a cured adhesive coating at their mating surfaces, said connection being further characterized as having an airtight seal capable of withstanding pressure of 3 p.s.i.g. and a vacuum of 12 inches of mercury.

2. The battery container of claim 1 wherein the adhesive on the mating surfaces is a epoxy resin.

3. The battery container of claim 1 wherein the polypropylene on the mating surfaces is flame oxidized polypropylene.

4. The battery container of claim 1 wherein the walls have a thickness not in excess of about 0.150 inch.

5. The battery container of claim 1 wherein the mating surfaces are multiplanar.

* * * * *